(12) United States Patent
Korol

(10) Patent No.: US 11,772,328 B2
(45) Date of Patent: Oct. 3, 2023

(54) THREE-DIMENSIONAL PRINTING SYSTEM HAVING SEMIPERMEABLE TRANSPARENT SHEET WITH AEROSTATIC SUPPORT

(71) Applicant: 3D Systems, Inc., Rock Hill, SC (US)

(72) Inventor: Evgeny Korol, Rock Hill, SC (US)

(73) Assignee: 3D SYSTEMS, INC., Rock Hill, SC (US)

( * ) Notice: Subject to any disclaimer, the term of this patent is extended or adjusted under 35 U.S.C. 154(b) by 156 days.

(21) Appl. No.: 17/086,049

(22) Filed: Oct. 30, 2020

(65) Prior Publication Data

US 2021/0129439 A1 May 6, 2021

Related U.S. Application Data

(60) Provisional application No. 62/929,135, filed on Nov. 1, 2019.

(51) Int. Cl.
*B29C 64/364* (2017.01)
*B29C 64/245* (2017.01)
*B33Y 30/00* (2015.01)
*B29C 64/124* (2017.01)
*B29C 64/264* (2017.01)

(52) U.S. Cl.
CPC .......... *B29C 64/364* (2017.08); *B29C 64/124* (2017.08); *B29C 64/245* (2017.08); *B29C 64/264* (2017.08); *B33Y 30/00* (2014.12)

(58) Field of Classification Search
CPC ... B29C 64/245; B29C 64/364; B29C 64/264; B29C 64/124; B33Y 30/00
See application file for complete search history.

(56) References Cited

U.S. PATENT DOCUMENTS

2016/0303795 A1\* 10/2016 Liu ........................ B29C 64/364
2020/0094468 A1\* 3/2020 Feller .................... B29C 64/124

\* cited by examiner

*Primary Examiner* — Joseph S Del Sole
*Assistant Examiner* — Jamel M Nelson

(57) ABSTRACT

A three-dimensional printing system includes a support plate, a transparent sheet, gas pressure source, and a conduit. The support plate includes a transparent central portion and defines a gas inlet and a gas outlet. The transparent sheet overlays the transparent central portion, the gas inlet, and the gas outlet of the support plate. A central chamber is defined between the transparent sheet and the support plate. The gas pressure source is coupled to the gas inlet through the conduit. An input fluid flow resistance $L_i$ is defined from the gas pressure source to the central chamber. An output fluid flow resistance $L_o$ is defined out through the gas outlet and to an outside location. A ratio of $L_i$ to $L_o$ is sufficient to allow a stable control of a physical configuration of the central unsupported portion of the transparent sheet above the support plate.

18 Claims, 4 Drawing Sheets

THREE-DIMENSIONAL PRINTING SYSTEM HAVING SEMIPERMEABLE TRANSPARENT SHEET WITH AEROSTATIC SUPPORT

CROSS-REFERENCE TO RELATED APPLICATIONS

This non-provisional patent application claims priority to U.S. Provisional Application Ser. No. 62/929,135, Entitled "THREE-DIMENSIONAL PRINTING SYSTEM HAVING SEMIPERMEABLE TRANSPARENT SHEET WITH AEROSTATIC SUPPORT" by Evgeny Korol, filed on Nov. 1, 2019, incorporated herein by reference under the benefit of U.S.C. 119(e).

FIELD OF THE INVENTION

The present disclosure concerns an apparatus and method for fabrication of solid three dimensional (3D) articles of manufacture from radiation curable (photocurable) resins. More particularly, the present disclosure improves precision of an optical path in a three-dimensional printer.

BACKGROUND

Three dimensional (3D) printers are in rapidly increasing use. One class of 3D printers includes stereolithography printers having a general principle of operation including the selective curing and hardening of radiation curable (photocurable) liquid resins. A typical stereolithography system includes a resin vessel holding the photocurable resin, a movement mechanism coupled to a support tray, and a controllable light engine. The stereolithography system forms a three dimensional (3D) article of manufacture by selectively curing layers of the photocurable resin onto a surface of the support tray. Each selectively cured layer is formed at a "build plane" within the resin.

One variant of this type of system defines a build plane between a lower face of the support tray and a flexible, transparent sheet. A challenge is to maintain a precise geometric configuration of the transparent sheet.

SUMMARY

Figure 1:
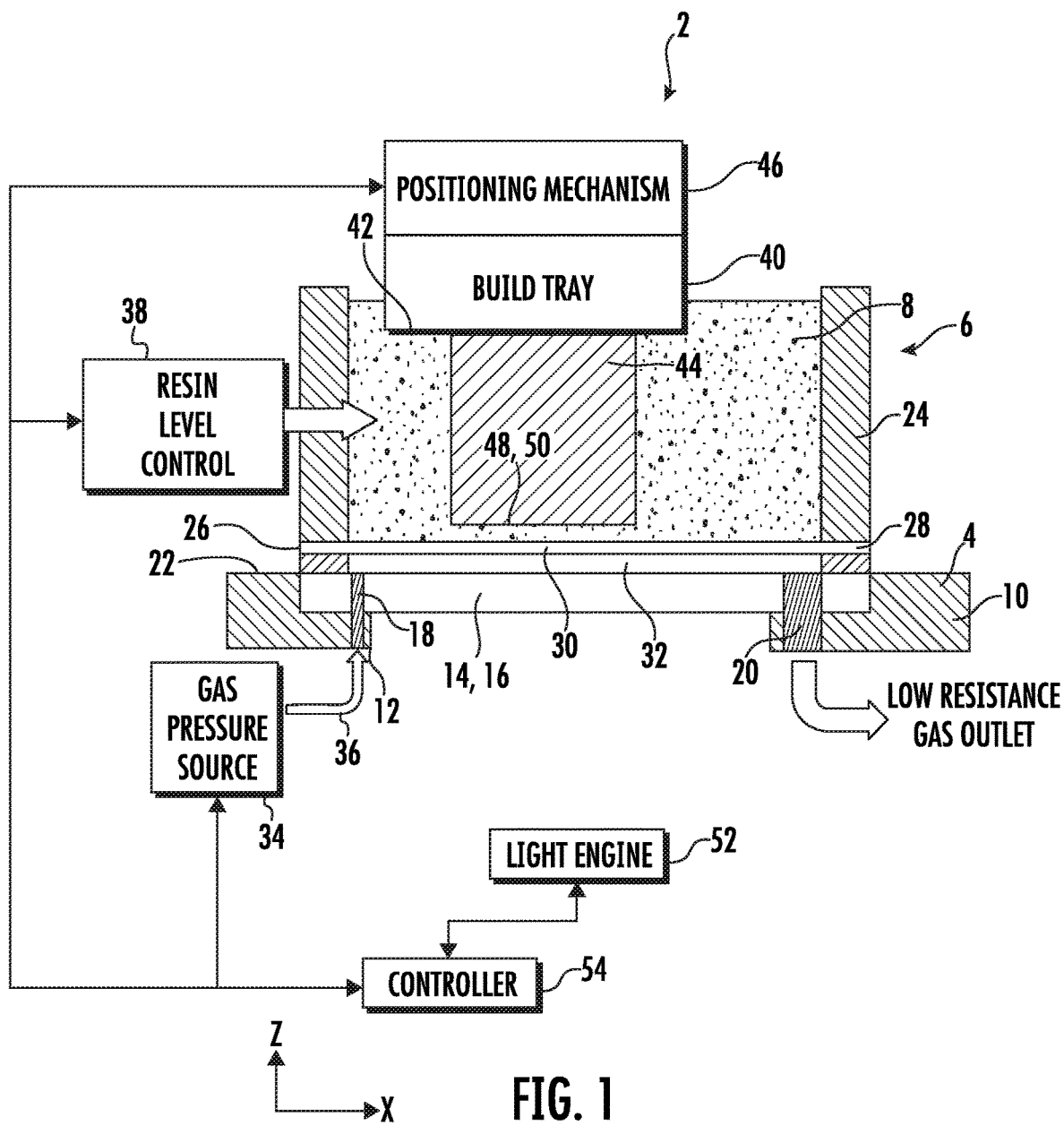
FIG. 1 is a schematic diagram of a three-dimensional printing system.

A three-dimensional printing system for fabricating a three-dimensional article includes a support plate, a transparent sheet, gas pressure source, and a conduit. The support plate includes a transparent central portion and defines a gas inlet and a gas outlet. The transparent sheet is disposed above the support plate and includes a peripheral seal portion and a central unsupported portion. The peripheral seal portion is sealed with respect to the support plate. The central unsupported portion is bounded by the peripheral seal portion and overlays the transparent central portion, the gas inlet, and the gas outlet. A central chamber is defined between the transparent sheet and the support plate and is bounded by the peripheral seal portion. The conduit is coupled to the gas inlet. The gas pressure source provides gas with a gauge pressure $P_s$ to the gas conduit. A gauge pressure is defined as a pressure difference between an absolute pressure and a surrounding atmospheric pressure. A fluid flow resistance $L_o$ is defined for a fluid path from the central chamber, through the fluid outlet, and to a position external to the central chamber. A fluid flow resistance $L_i$ is defined for a fluid path between the gas pressure source and the central chamber which includes the conduit and the gas inlet. $L_i$ is greater than $L_o$ to a sufficient degree to maintain a stable aerostatic configuration of the central unsupported portion above the transparent central portion of the support plate. This allows for a very precise position of the central unsupported portion of the transparent sheet which in turn allows for extremely precise dimensions for the three-dimensional article being fabricated.

In one implementation, the transparent sheet rests upon an upper surface of the transparent central portion of the support plate when the gauge pressure $P_s$ is zero. As $P_s$ is raised above zero, the transparent central portion bows upwardly above at least part of the transparent central portion of the support plate.

In another implementation, the peripheral seal portion of the transparent sheet is supported above an upper surface of the support plate. When $P_s$ is zero, the central unsupported portion of the transparent sheet is at least partially suspended above the transparent central portion of the support plate. The value of $P_s$ can be adjusted to allow the transparent sheet to remain flat even when a column of resin exerts a downward force on the central unsupported portion of the transparent sheet. A generally uniform gap can be maintained between the central unsupported portion of the transparent sheet and the transparent central portion of the support plate. The gap can be within a range of 100 to 500 microns. More particularly, the gap can be in a range of 150 to 250 microns or about 200 microns.

In yet another implementation, $P_s$ has a value of at least 5 pounds per square inch (PSI). In other implementations, $P_s$ has a value of at least 10 PSI, at least 15 PSI, at least 20 PSI, at least 30 PSI, or other values. The high pressure is indicative of a high input fluid flow resistance $L_i$. The high value of $L_i$ and $P_s$ allows for more precise control of a physical configuration or height of the central unsupported portion of the transparent sheet above the transparent central portion of the support plate.

In a further implementation, $L_i$ is at least ten times $L_o$ or the ratio $L_i/L_o$ is at least ten. The ratio of $L_i/L_o$ can be greater than 10 or at least 15 or at least 20 or even greater. A larger ratio generally means that the height of the central unsupported portion of the transparent sheet above the transparent central portion of the support plate can be more precisely controlled.

In a yet further implementation, the central chamber has an operational gauge pressure of $P_c$. A ratio of $P_s/P_c$ is at least 10. The ratio of $P_s/P_c$ can be at least 30 or at least 100. A larger ratio generally allows for a more precise control of the height of the central unsupported portion of the transparent sheet above the transparent central portion of the support plate.

In another implementation a flow resistance $L_c$ is defined for gas passing through the central chamber from the gas inlet to the gas outlet. The value of $L_c$ is a variable function of the gas flow rate (because the gas flow rate determines a geometric configuration or shape of the central unsupported portion of the transparent sheet). In some embodiments, $L_i$ is at least ten times $(L_o + L_c)$ during operation during which gas is flowing through the central chamber.

In yet another implementation, the three dimensional printing system includes a substructure, a build tray, a positioning mechanism, a light engine, and a controller. The substructure cooperates with the transparent sheet to define a resin vessel to house a column of photocurable resin above the central unsupported portion of the transparent sheet. The light engine is configured to project radiation up through the transparent central portion of the support plate and the transparent sheet and to a build plane within the resin. The build tray has a lower surface for supporting the three-dimensional article. The positioning mechanism is coupled to the build tray and configured to vertically position a lower face of the three-dimensional article generally at the build plane. The controller is operatively coupled to the light engine and the positioning mechanism. The controller operates the light engine and the positioning mechanism to fabricate the three-dimensional article in a layer-by-layer manner. The controller can also be coupled to the gas pressure source to modulate $P_s$ to thereby control a physical configuration of the central unsupported portion of the transparent sheet above the support plate. The controller can also be coupled to the conduit to control $L_i$.

DETAILED DESCRIPTION OF THE PREFERRED EMBODIMENTS

FIG. 1 is a schematic diagram of a three-dimensional printing system 2. In describing system 2, mutually orthogonal axes X, Y, and Z can be used. Lateral axes X and Y are generally horizontal and vertical axis Z is generally aligned with a gravitational reference. The term "generally" implies that a geometry or magnitude is not necessarily exact but by design and accurate to within manufacturing tolerances.

System 2 includes a support plate 4 that supports a resin vessel 6 for containing a photocurable resin 8. Support plate 4 includes a structural plate 10 that defines a central opening 12. A transparent plate 14 closes the central opening 12 and includes a transparent central portion 16 of the support plate 4. The support plate 4 defines a gas inlet 18 and a gas outlet 20 that both communicate with an upper side 22 of the support plate 4.

The resin vessel 6 includes a substructure 24 coupled to a transparent sheet 26. The substructure 24 and the transparent sheet 26 cooperate to contain the resin 8. The transparent sheet 26 includes a peripheral seal portion 28 and a central unsupported portion 30. The peripheral seal portion 28 is sealed with respect to the support plate 4. The central unsupported portion overlays the transparent central portion 16 of the support plate, the gas inlet 18, and the gas outlet 20. A central chamber 32 is defined between the central unsupported portion 30 of the transparent sheet 26 and the support plate 4.

A gas pressure source 34 is coupled to the gas inlet 18 via a conduit 36. The gas pressure source 34 supplies gas to the conduit 36 having a gauge pressure $P_s$. A gauge pressure P of a gas equals a difference between an absolute pressure of the gas and an absolute pressure of an outside atmosphere surrounding system 2. In an illustrative embodiment, $P_s$ is at least equal to 5 PSI (pounds per square inch). In some embodiments, $P_s$ can be at least 10 PSI, at least 15 PSI, at least 20 PSI, at least 25 PSI, or more than 30 PSI.

In the following discussion, a quantity known as a "flow resistance" L will be introduced. For a given conduit carrying a fluid, an equation called "Lohm's law" states that $\Delta P = L$ times Q with the definitions: $\Delta P$=differential pressure in the conduit; L=flow resistance; Q=flow rate of fluid (volumetric flow rate at a standard temperature and pressure such as STP which is 273 degrees Kelvin and 1 atmosphere of pressure). It is possible that L may be a function of pressure so that the relationship may not be linear.

The conduit 36 and the gas inlet 18 together define an input flow resistance $L_i$ between the gas pressure source 34 and the central chamber 32. An output flow resistance $L_o$ is defined between the central chamber 32 through the gas outlet 20 and to a point outside the gas outlet 20 and the central chamber 32. The input flow resistance $L_i$ quantifies a fluidic resistance to pushing fluid from the gas pressure source 34 and to the central chamber 32. The output flow resistance $L_o$ quantifies a fluidic resistance to releasing fluid from the central chamber 32 to the point outside. The input flow resistance $L_i$ is greater than the output flow resistance $L_o$. In an illustrative embodiment, $L_i$ is at least 10 times $L_o$.

A gap flow resistance $L_c$ defines a flow resistance in the central chamber 32 between the gas inlet 18 and the gas outlet 20. This is a variable resistance, since it depends upon the geometry of the central chamber 32 which in turn can depend upon a pressure within the chamber. In an illustrative embodiment $L_i \gg L_c$ or $L_i$ is at least ten times $L_c$ during typical operation with gas flow. Also, $L_c > L_o$.

During operation of system 2, the central chamber 32 has an internal gauge pressure of $P_c$. Due to the input flow resistance $L_i$, there is typically a large pressure drop from the gas pressure source 34 to the central chamber 32. As a result, $P_s$ is typically much larger than $P_c$. In an illustrative embodiment, $P_s$ is at least 10 times $P_c$. In some embodiments a ratio of $P_s$ to $P_c$ is at least 30 or at least 100.

In some embodiments, a resin level control 38 is configured to control a level of the photocurable resin 8 in the resin vessel 6. The resin level control 38 includes a sensor and a motorized resin supply which can be operated in a closed loop manner to maintain the level of the resin 8.

A build tray 40 has a lower surface 42 for supporting a three-dimensional article 44 being fabricated. A positioning mechanism 46 is coupled to the build tray 40. The positioning mechanism 46 is configured to position a lower face 48 of the three-dimensional article 44 at a build plane 50. A light engine 52 is configured to illuminate the build plane 50 to cure and solidify a layer of the photocurable resin 8 onto the lower face 48.

A controller 54 is controllably coupled to the gas pressure source 34, the resin level control 38, the positioning mechanism 46, the light engine 52, and other portions of system 2. The controller 54 includes a processor coupled to an information storage device. The information storage device includes a non-volatile or non-transient data storage that stores software instructions. When executed by the processor, the software instructions operate portions of system 2 to perform various functions that the controller is configured to perform.

To manufacture the three-dimensional article 44, the controller is configured to: (1) operate the positioning mechanism to position the lower face 42 of the build tray or the lower face 48 of article 44 at the build plane 50, (2)

operate the light engine 52 to selectively cure an accretive layer of photocure resin 8 onto the lower face 48, (3) repeat (1) and (2) to complete fabrication of the three-dimensional article 44. The controller can also be configured to: (1) operate the gas pressure source 34 (to control $P_s$) and/or part of conduit 36 (to control $L_i$) to control a geometric configuration of the central unsupported portion 30 of the transparent sheet 26 and/or (2) operate the resin level control 38 to maintain a level of resin 8 in the resin vessel 6.

Figure 2:
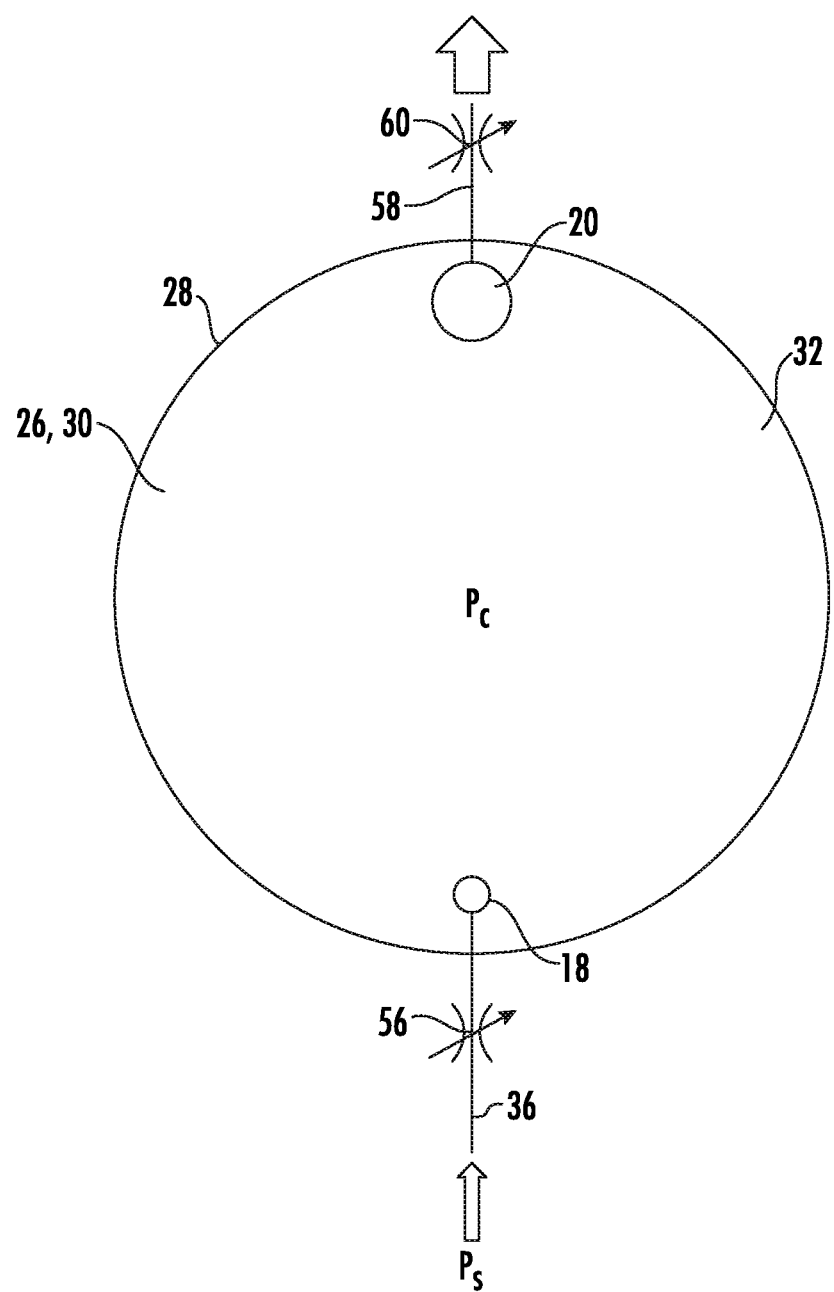
FIG. 2 is a plan view schematic of a first embodiment of a central chamber defined between a support plate and transparent sheet.

FIG. 2 is a schematic plan view of a first embodiment of the central chamber 32 defined between support plate 4 and the transparent sheet 26. A circular boundary represents the peripheral seal 28 of the transparent sheet 26 to the support plate 4 which laterally bounds the central chamber 32. In the illustrated embodiment, the conduit 36 includes a flow restrictor 56. The flow restrictor 56 can be controllable and is primarily what determines the input flow resistance $L_i$. In some embodiments, an opening orifice size of the gas inlet 18 can be used to control the input flow resistance $L_i$ so that there is no need for flow restrictor 56. In yet other embodiments, $L_i$ can be determined by both a flow restrictor 56 and an orifice size of the gas inlet 18.

The gas outlet 20 is coupled to an output conduit 58 that can lead to an outside atmosphere. In some embodiments, output conduit 58 can include an output flow restrictor 60. The output flow resistance $L_o$ is the total flow resistance through the gas outlet 20 and conduit 58. As discussed earlier, a flow resistance $L_c$ can be defined between the gas inlet 18 and the gas outlet 20. It is to be noted that $L_c$ is dependent upon the geometric configuration of the transparent sheet 26 over the central chamber 32. During operation, $L_i$ is typically much greater than $L_c+L_o$. During operation, $L_i$ is at least ten times $L_c+L_o$.

Figure 3:
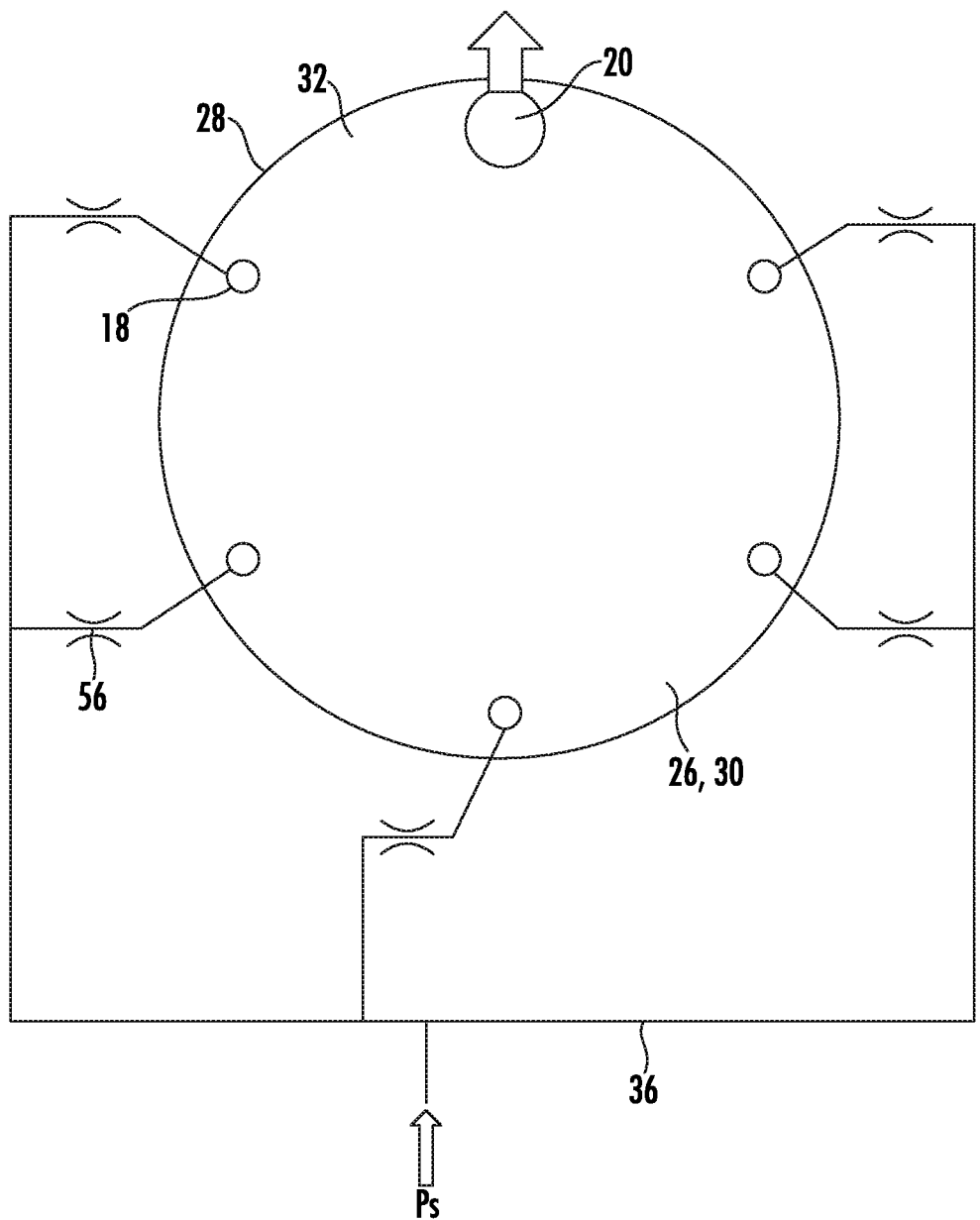
FIG. 3 is a plan view schematic of a second embodiment of a central chamber defined between a support plate and transparent sheet.

FIG. 3 is a schematic plan view of a second embodiment of the central chamber 32 defined between support plate 4 and the transparent sheet 26. In describing FIG. 3, a focus is made on differences with this second embodiment relative to the first embodiment of FIG. 2. The conduit 36 branches out to five gas inlets 18. Also, conduit 36 includes a flow restrictor 56 in series with each gas inlet 18. The input flow resistance $L_i$ is the flow resistance between the gas pressure source 34 and the central chamber 32. The flow resistance $L_o$ out of the gas outlet is much lower than $L_i$. One advantage of the second embodiment is when the central chamber 32 has a large lateral area. In other embodiments (not shown), the central chamber 32 can have other lateral shapes such as square, rectangular, rectangular with rounded corners, regular polygon, or irregular polygon, to name a few examples. Yet other embodiments may have more than one gas outlet 20. In some embodiments, the gas inlets 18 and outlets 20 can be arranged in an alternating or other patterns around the periphery of the central chamber 32.

Figure 4A:
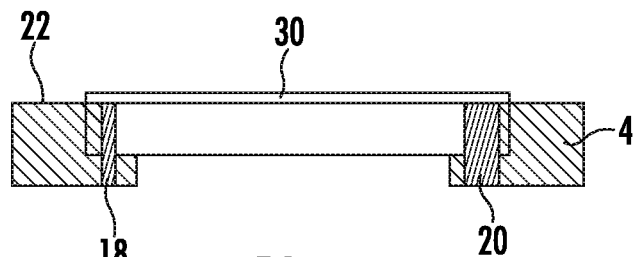
FIG. 4A is a cross-sectional schematic diagram of an embodiment of a portion of a system in which the central unsupported portion of the transparent sheet lays flat on a support plate with no gas flow.
Figure 4B:
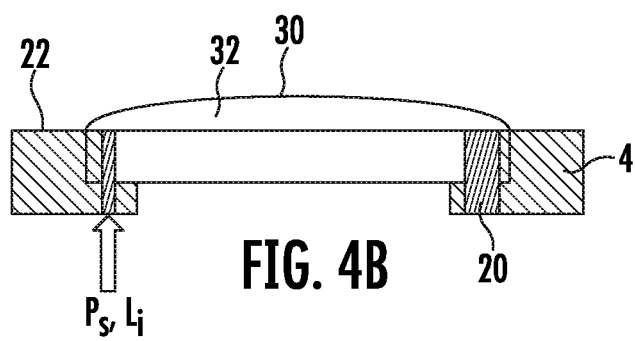
FIG. 4B is a cross-sectional schematic diagram of the FIG. 4A embodiment when gas flow between the central unsupported portion of the transparent sheet and the support plate is present.

FIGS. 4A (no gas flow) and 4B (gas flow) are cross-sectional schematic diagrams that depict a first illustrative embodiment of a portion of system 2. According to FIG. 4A, with no gas flow, the central unsupported portion 30 of the transparent sheet 26 lays directly on the upper surface 22 of the support plate 4. When the gas pressure source $P_s$ applies pressure to conduit 36, the flow rate of gas into the central chamber 32 is primarily limited by the input flow resistance $L_i$. Because the output flow resistance $L_o$ is very low, any remaining pressure drop is primarily under the central unsupported portion 30 of the transparent sheet 26. The sheet will stabilize at a certain geometric configuration as illustrated in FIG. 4B. In some embodiments a maximum gap between the transparent sheet 26 and the upper surface 22 is in a range of 100 to 500 microns. In a more particular embodiment the maximum gap can be between 200 and 250 microns or about 200 microns.

Figure 5:
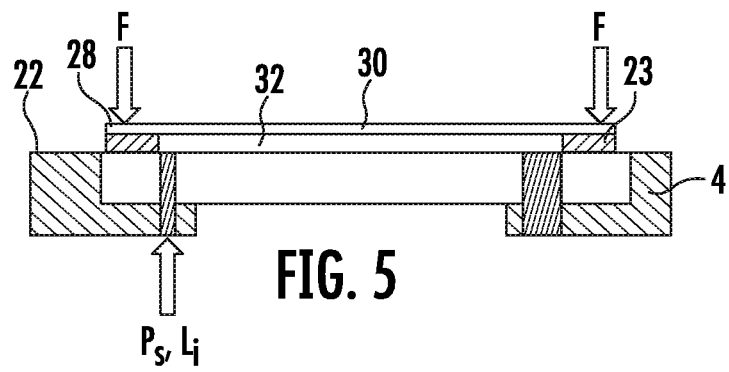
FIG. 5 is a cross-sectional schematic diagram of a portion of a system in which a peripheral seal portion of a transparent sheet is supported above an upper surface of a support plate.

FIG. 5 is a cross-sectional schematic of a second illustrative embodiment of a portion of system 2. FIG. 5 is similar to FIG. 4B except that the peripheral seal portion 28 of the transparent sheet 26 is supported above the upper surface 22 with a shim 23. With a proper control of Ps and Li, the central unsupported portion 30 of the transparent sheet 26 is flat above the surface 22. Thus, a gap between the transparent sheet 26 and the upper surface 22 is defined by a thickness of the shim 23. In the illustrated embodiment, a gap between the transparent sheet 26 and the upper surface 22 is in a range of 100 to 500 microns. In a more particular embodiment the gap can be between 200 and 250 microns or about 200 microns.

The specific embodiments and applications thereof described above are for illustrative purposes only and do not preclude modifications and variations encompassed by the scope of the following claims.

What is claimed:

1. A three-dimensional printing system for fabricating a three-dimensional article comprising:
    a support plate including a transparent central portion, the support plate defining a gas inlet and a gas outlet;
    a transparent sheet disposed above the support plate, the transparent sheet including:
        a peripheral seal portion that is sealed with respect to the support plate; and
        a central unsupported portion bounded by the peripheral seal portion and overlaying the transparent central portion, the gas inlet, and the gas outlet and defining a central chamber between the transparent sheet and the support plate;
    a flow resistance $L_o$ is defined for gas exiting from the central chamber through the gas outlet;
    a gas pressure source providing gas to the gas inlet; and
    a conduit coupled between the gas pressure source and the gas inlet;
    a flow resistance $L_i$ is defined for gas passing through the conduit, through the gas inlet, and to the central chamber, $L_i > L_o$ to allow the central unsupported portion of the transparent sheet to maintain a stable configuration as a function of a source gauge pressure $P_s$ applied by the gas pressure source to the conduit.

2. The three-dimensional printing system of claim 1 wherein the transparent sheet rests upon an upper surface of the transparent central portion of the support plate when the gauge pressure $P_s$ is zero.

3. The three-dimensional printing system of claim 1 wherein the peripheral seal portion of the transparent sheet is supported above the upper surface of the transparent central portion of the support plate.

4. The three-dimensional printing system of claim 3 wherein the support of the peripheral seal portion and the source gauge pressure $P_s$ maintain a gap between the central unsupported portion of the transparent sheet and the transparent central portion of the support plate in a range of 100 to 500 microns.

5. The three-dimensional printing system of claim 1 wherein $P_s$ is at least 5 pounds per square inch (PSI).

6. The three-dimensional printing system of claim 1 wherein $P_s$ is at least about 15 pounds per square inch (PSI).

7. The three-dimensional printing system of claim 1 wherein $L_i$ is at least 10 times $L_o$.

8. The three-dimensional printing system of claim 1 wherein $P_c$ is a gauge pressure in the central chamber, $P_s$ is at least 10 times $P_c$.

9. The three-dimensional printing system of claim 8 wherein $P_s$ is at least 30 times $P_c$.

10. The three-dimensional printing system of claim 8 wherein $P_s$ is at least 100 times $P_c$.

11. The three-dimensional printing system of claim 1 wherein a resin vessel includes a substructure that is coupled to the transparent sheet, the substructure cooperates with the transparent sheet to house a column of photocurable resin.

12. The three-dimensional printing system of claim 11 further comprising:
    a light engine configured to project radiation up through the transparent central portion of the support plate and the transparent sheet and to a build plane within the resin;
    a build tray having a lower surface for supporting the three-dimensional article;
    a positioning mechanism for positioning a lower surface of the three-dimensional article proximate to the build plane; and
    a controller at least operatively coupled to the light engine and the positioning mechanism, the controller operates the light engine and the positioning mechanism to fabricate the three-dimensional article in a layer-by-layer manner.

13. The three-dimensional printing system of claim 12 wherein the controller is coupled to one or more of the gas pressure source and the conduit to modulate the pressure $P_c$ to maintain a desired configuration of the unsupported portion of the transparent sheet.

14. A three-dimensional printing system for fabricating a three-dimensional article comprising:
    a support plate including a transparent central portion, the support plate defining a gas inlet and a gas outlet;
    a transparent sheet disposed above the support plate, the transparent sheet including:
        a peripheral seal portion that is sealed with respect to the support plate; and
        a central unsupported portion bounded by the peripheral seal portion and overlaying the transparent central portion, the gas inlet, and the gas outlet and defining a central chamber between the transparent sheet and the support plate;
    a flow resistance $L_o$ is defined for gas exiting from the central chamber through the gas outlet;
    a flow resistance $L_c$ is defined for gas passing through the central chamber from the gas inlet to the gas outlet, a value of $L_c$ is a variable function of a gas flow rate;
    a gas pressure source providing gas to the gas inlet; and
    a conduit coupled between the gas pressure source and the gas inlet;
    a flow resistance $L_i$ is defined for gas passing through the conduit, through the gas inlet, and to the central chamber, $L_i > (L_o + L_c)$ during a steady state flow of gas that maintains a stable physical configuration of the transparent sheet.

15. The three-dimensional printing system of claim 14 wherein the peripheral seal portion of the transparent sheet is supported above the upper surface of the transparent central portion of the support plate.

16. The three-dimensional printing system of claim 15 wherein the support of the peripheral seal portion and a source gauge pressure ($P_s$) of the gas pressure source maintain a gap between the central unsupported portion of the transparent sheet and the transparent central portion of the support plate in a range of 100 to 500 microns.

17. The three-dimensional printing system of claim 15 wherein the transparent sheet is supported to be generally flat above the central portion of the support plate.

18. The three-dimensional printing system of claim 14 wherein $L_i$ is at least ten times $(L_o + L_c)$ during operation.

* * * * *